United States Patent [19]

Han

[11] Patent Number: 5,705,805

[45] Date of Patent: Jan. 6, 1998

[54] TRANSMISSIVE/REFLECTIVE OPTICAL SCANNING APPARATUS

[75] Inventor: Loi Han, Alhambra, Calif.

[73] Assignee: Microtek International, Inc., Hsinchu, Taiwan

[21] Appl. No.: 717,163

[22] Filed: Sep. 20, 1996

Related U.S. Application Data

[63] Continuation-in-part of Ser. No. 393,112, Feb. 21, 1995, Pat. No. 5,574,274.

[51] Int. Cl.⁶ ............................................................ H04N 1/04
[52] U.S. Cl. ............................. 250/204.1; 250/234; 358/474
[58] Field of Search .................................. 250/208.1, 234, 250/235; 358/474, 487, 493, 494, 505, 506, 508, 513

[56] References Cited

U.S. PATENT DOCUMENTS

| | | | |
|---|---|---|---|
| 4,656,525 | 4/1987 | Norris | 358/487 |
| 4,829,184 | 5/1989 | Nelson et al. | 250/358.1 |
| 4,879,604 | 11/1989 | Koshiyouji | 358/474 |
| 4,989,099 | 1/1991 | Koshiyouji et al. | 358/474 |
| 5,140,443 | 8/1992 | Iwahara et al. | 358/474 |
| 5,282,081 | 1/1994 | Chen et al. | 358/474 |
| 5,333,066 | 7/1994 | Sugata | 250/208.1 |
| 5,341,192 | 8/1994 | Wally, Jr. et al. | 355/50 |
| 5,457,547 | 10/1995 | Yamada | 358/474 |
| 5,546,144 | 8/1996 | Lam et al. | 353/120 |
| 5,574,274 | 11/1996 | Rubley et al. | 250/208.1 |

Primary Examiner—Stephone B. Allen
Attorney, Agent, or Firm—Small, Larkin & Kidde

[57] ABSTRACT

An optical scanning apparatus for retrieving digital electronic images representative of opaque and transmissive objects. The apparatus is equipped with an optical switch which is operated by solenoid switches positioned at one end of the scanning apparatus. A scanning camera equipped with transmissive and reflective light sources for illuminating the corresponding objects may be selected by the operator to retrieve images of either the reflective or transmissive object type.

6 Claims, 5 Drawing Sheets

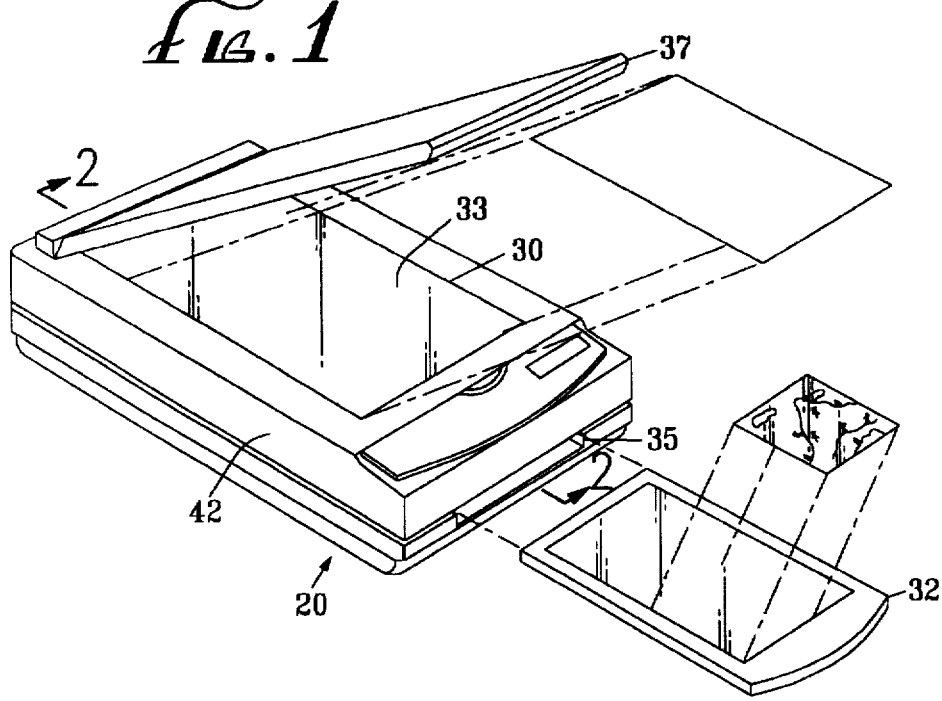
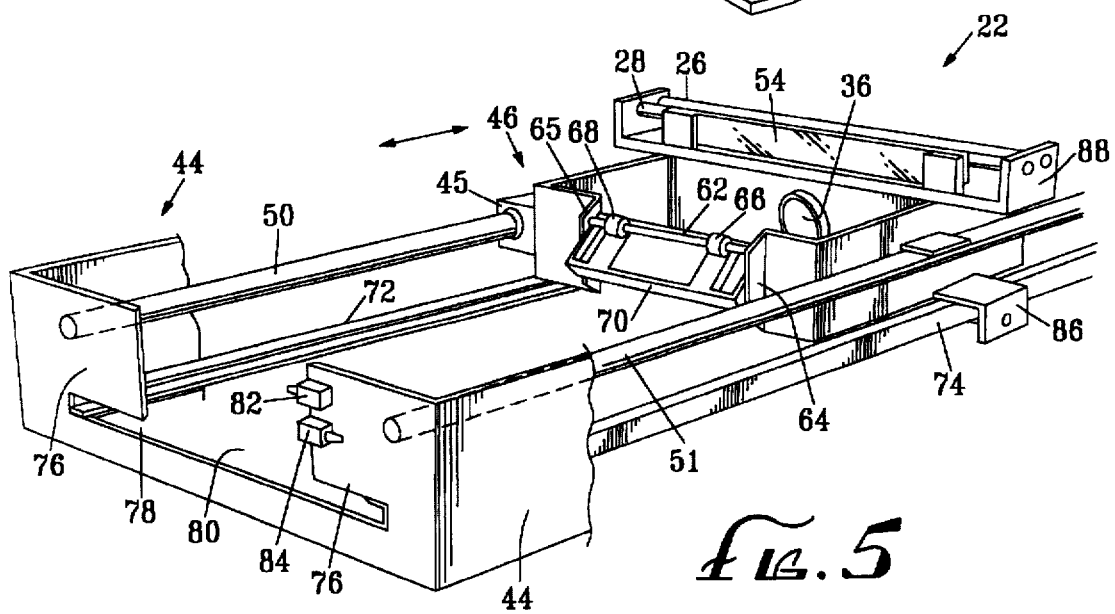

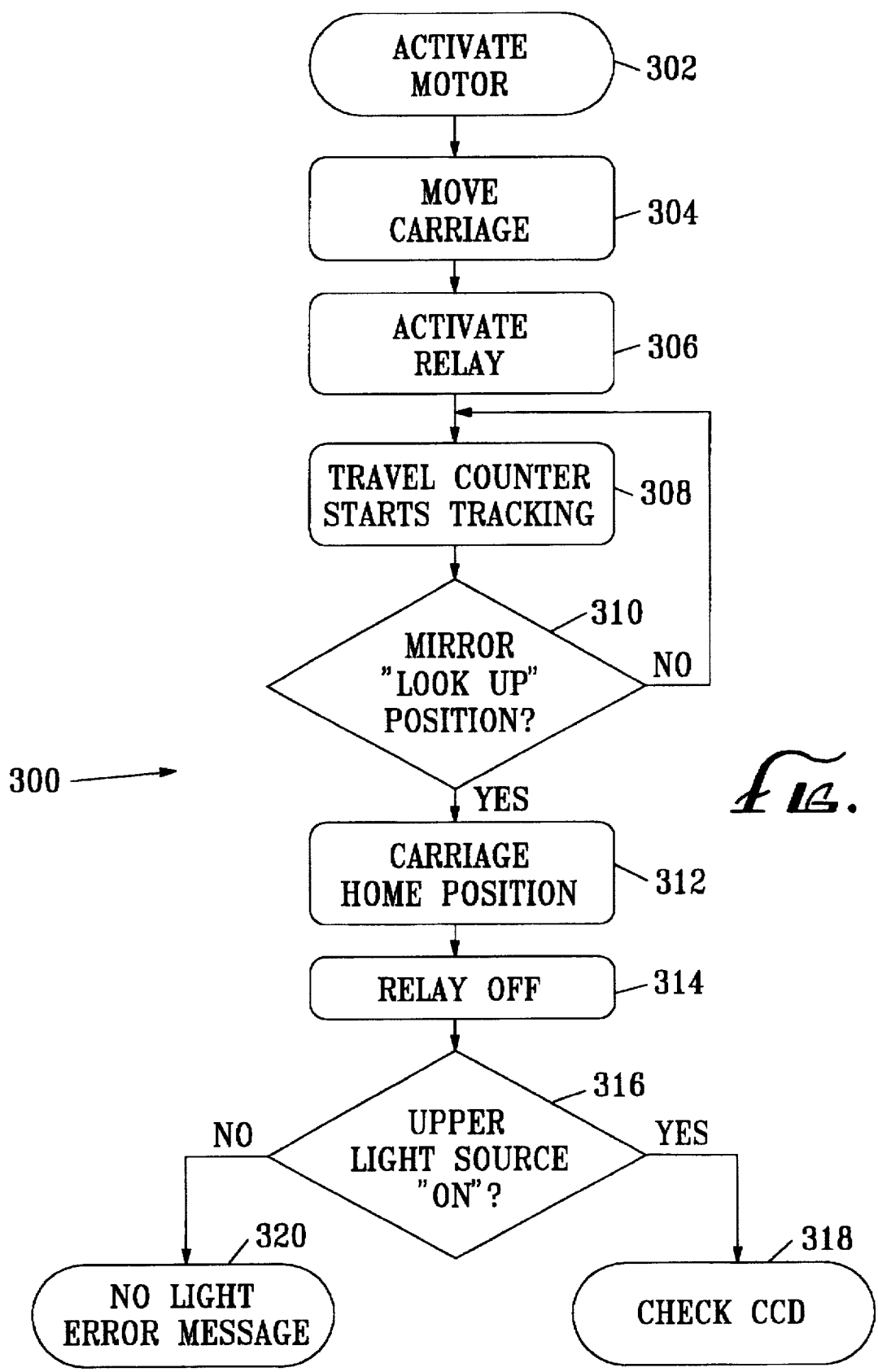

TRANSMISSIVE/REFLECTIVE OPTICAL SCANNING APPARATUS

The present application is a continuation-in-part of application Ser. No. 08/393,112, filed Feb. 21, 1995, now U.S. Pat. No. 5,574,274, which is incorporated by reference as if fully set forth herein. This application also incorporates by reference application Ser. No. 08/692,540 and U.S. Pat. No. 5,546,144.

BACKGROUND OF THE INVENTION

1. Field of the Invention

The present invention relates to an optical scanning apparatus and more particularly to a transmissive and reflective optical scanning apparatus incorporating an optical switch assembly to switch between a reflective mode and a transmissive mode of operation in an optical scanning apparatus of the type described in the application incorporated by reference herein.

2. Description of the Related Art

The description of the related art is set forth in application Ser. No. 08/393,112, U.S. Pat. No. 5,574,274, referred to above.

OBJECTS AND SUMMARY OF THE INVENTION

It is an object of the present invention to provide an optical scanning apparatus for the transmissive and reflective scanning of images using a single mirror to switch between transmissive scanning and reflective scanning modes of operation.

In accordance with the objects of the present invention, a conventional scanner housing is provided with a scanning camera comprising a Charge-Coupled Device (CCD) and a fixed focus lens. At least one scanning platform is included within the scanner housing. The scanning camera also includes reflective and transmissive light sources respectively positioned to direct light upon a corresponding object. An optical pathway places objects to be scanned within the field of view of the scanning camera. The scanning camera further includes a movable camera carriage for supporting the CCD, optical pathway and transmissive and reflective light sources thereon. In this manner the scanning camera can be moved to scan across reflective or transmissive images illuminated by the respective light sources. The scanning camera and light source carriage is located on rails which are positioned lengthwise along the scanner housing and are mounted on an inner housing, or chassis. The carriage during operation, is incrementally moved along the rails to scan the object line by line and, during set up mode, to reconfigure the optical pathway for transmissive or reflective modes of operation.

The optical pathway includes a reflective pathway and a transmissive pathway. The respective pathway is selected by an optical switch to switch between a reflective mode of operation and a transmissive mode of operation.

The optical switch is a mirror which may be selectively positioned within the field of view of the scanning camera to redirect the view of the scanning camera between the reflective scanning platform and the transmissive scanning platform. By positioning the mirror to change the location of objects viewed by the scanning camera, two separately designed scanning platforms may be used by the same scanning camera. The optical switch provides for the scanning of reflective and transmissive objects using separate scanning platforms, each of which is tailored to achieve the optimal scanning environment for the respective types of images. The optical switch and optical pathway achieves this dual scanning capability with a minimal number of additional parts. The optical switch of the present invention is switched through switching components located at one end of the inner housing, or chassis and controlled by a set up routine. Other features and advantages of this invention will be made apparent upon review of the drawings and detailed description of the invention.

BRIEF DESCRIPTION OF THE DRAWINGS

The objects and advantages of the present invention will become more readily apparent to those ordinarily skilled in the art after viewing the following detailed description and accompanying drawings wherein:

FIG. 1 is a perspective view of the optical scanner of the present invention;

FIG. 5 is perspective, partial view of a moving scanning camera of FIG. 2 showing an optical switch configured for transmissive scanning and in its carrier housing;

FIG. 7 is a flow diagram of a platform selection routine of the present invention for the reflective mode of operation.

DETAILED DESCRIPTION

Figure 2:
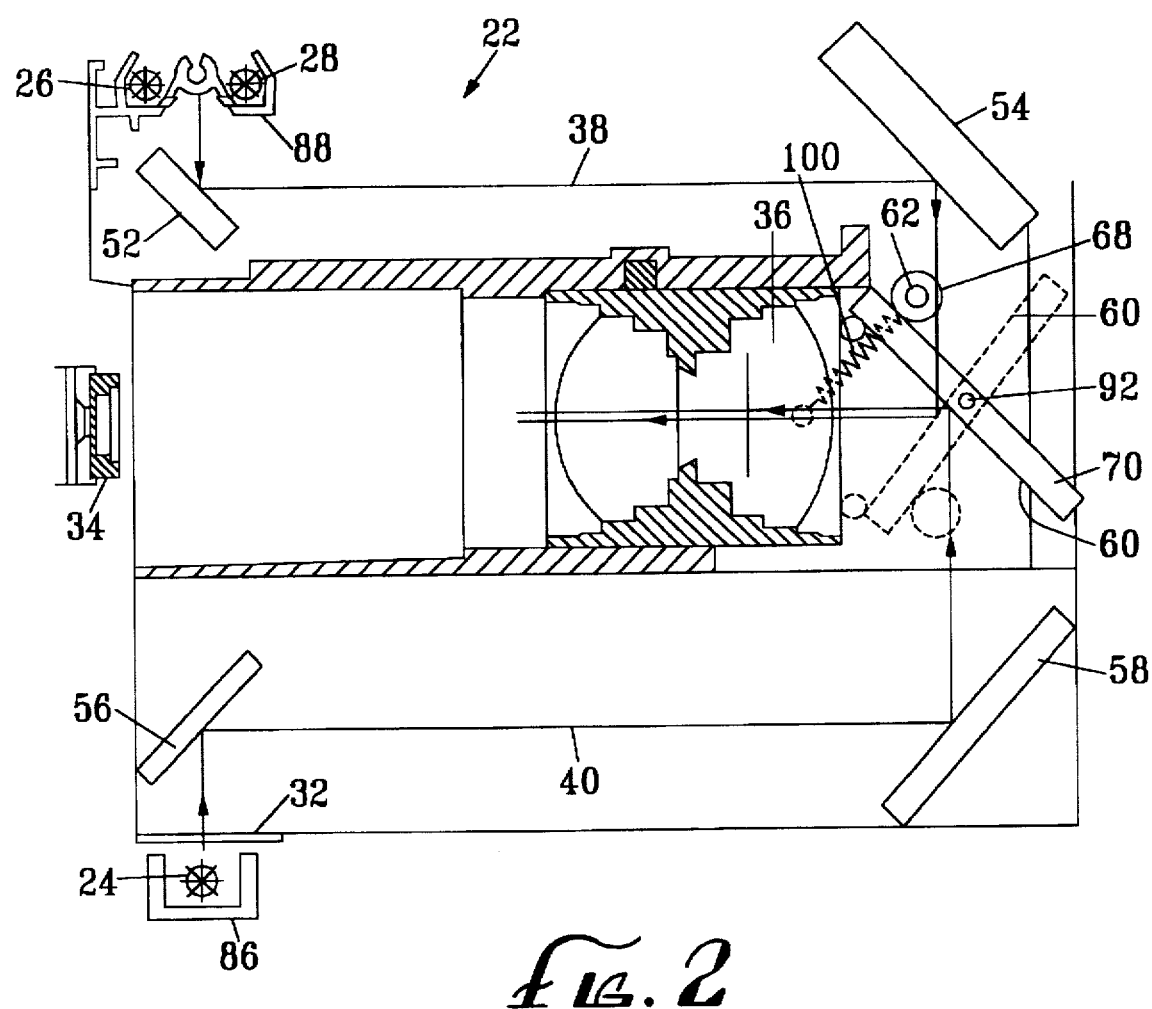
FIG. 2 is a cut-away side view of the optical scanner of FIG. 1 taken along line 2—2 showing a scanning camera with a preferred embodiment flip mirror of the present invention.

With reference to the figures for purposes of illustration, the present invention is generally a transmissive and reflective optical scanner as illustrated in FIG. 1. The scanner 20 includes generally a scanning camera, a transmissive light source 24 and a two-bulb refection light source 26, 28 a reflective scanning platform 30, a transmissive scanning platform 32 and an optical switch which alternates between a reflective mode of operation and a transmissive mode of operation. In the preferred embodiment of the parent application incorporated herein by reference, the optical switch is activated by solenoids mounted on the side of the inner housing chassis along the length of the rails which support the carriage (side mounted solenoids). In the preferred embodiment herein, the optical switch is activated by solenoids mounted on an end panel of the inner housing carriage at the end of the rails which support the chassis (end mounted solenoids). The scanner conventionally connects to a power source and a personal computer (not shown). Used in a conventional manner, the personal computer receives digital data representative of the image scanned by the optical scanner.

A digital camera CCD 34 and lens 36 are aligned alternatively with at least one of the light sources 24, 26, 28 and the object to be scanned by means of a reflective optical pathway 38 or a transmissive optical pathway 40, as shown in FIG. 2. The combination of a scanning camera having both reflective and transmissive light sources 24, 26, 28 secured to the camera ensures that the alignment between these elements is maintained.

With reference to FIGS. 1 and 5, the transmissive and reflective scanner includes generally a rectangular housing 42 with a reflective scanning platform 30 and a docking port 35 to secure a transmissive scanning platform 32. The reflective scanning platform 30 consists of a rectangular glass platen 33 secured in an aperture within the upper surface of the housing. A lid 37, attached by a hinge to the rear end of the housing may be rotatably positioned to overlie the glass platen 33 to block out ambient light. The reflective scanning platform as described is conventional in design.

Underlying the reflective scanning platform and secured to rails 50 and 51, and running lengthwise along an interior cavity within an inner housing or chassis 44 is the scanning camera 22 (FIGS. 2 and 5) as described in greater detail in the applications incorporated by reference. The scanning camera 22 includes a camera carriage 46 which includes a plurality of collars 45 movably coupled to the rails 50 and 51. A timing belt (not shown) extends lengthwise alongside the rails and connects at opposite ends of the rails to pulleys connected to the drive shaft of a conventional stepper motor (not shown). The carriage 46 is conventionally secured to the timing belt by clamps. The stepper motor, electrically connected to a controller circuit, is responsive to the controller circuit to bi-directionally rotate the timing belt and thus incrementally position the carriage at any point along the rails 50 and 51. A CCD 34, the preferred type of opto-electric transducer, which is mounted at the lower rear end of the carriage with a field of view projecting toward the front of the carriage, is aligned with a centrally located fixed-focus lens 36. The CCD 34, connected in electrical circuit with the controller circuit, is responsive to send electrical signals representative of the images viewed by the CCD to the controller circuit.

The field of view of the CCD, extending through the lens towards the front of the carriage 46, is aligned with reflective and transmissive optical pathways 38 and 40 defined by a plurality of precisely aligned fixed mirrors and an optical switch mirror. The fixed mirrors are mounted onto the carriage conventionally with rubber mounts (not shown) to protect the mirrors during movement of the scanner. The mirrors, designed conventionally for use in optical instruments, include a reflective surface on the side confronting the reflected light to minimize any distortion that would occur if light is reflected through the glass to a reflective surface on the backside.

The mirrors provide an optical pathway which functions as a periscope with the mirrors configured to provide remote viewing of an image by the CCD. For example the reflective optical pathway receives light shifted into an upper horizontal portion of the carriage. Reflective pathway fixed mirrors 52 and 54, transmissive pathway fixed mirrors 56 and 58, and rotatable optical switch mirror 60 are shown in FIG. 2. Switch mirror 60 is shown in solid lines for the transmissive mode of operation in FIG. 2, and in dashed lines for the reflective mode of operation. The light is reflected from two parallel mirrors 52 and 54. Mirror 52 reflects light towards mirror 54 which reflects the light downward to switch mirror 60. Mirror 60 restores the light to a horizontal direction and reflects it through the lens 36 to the CCD 34.

The transmissive branch 40 includes a lamp 24 that projects light through the object scanned. Mirror 56, shifts the light to mirror 58 and then to switch mirror 60, which is shown positioned in the transmissive mode (solid lines). Bracket 86 functions to assist holding the lamp for transmissive mode scanning. Bracket 88 holds lamps 26 and 28 for reflective scanning, as shown in FIG. 5.

Movably positioned within the carriage 46 is the optical switch mirror 60. The optical switch mirror 60, rotatably coupled to the carriage 46, includes a roller axle 62 which extends width-wise across the carriage extended wall members 64 and 65. The axle includes elastomeric rollers 66 and 68. A frame 70 houses the switch mirror 60. Roller axle 62, and rollers 66 and 68 provide for smooth transition during rotation of the switch mirror 60 between the transmissive and reflective scanning positions, as will be described in greater detail below. Again referring to FIG. 5, lower rails 72 and 74 function to hold the transparency holder 32, as shown in FIG. 1. The chassis 44 includes a front wall or panel 76, which in turn includes a slot 78 through which the transparency holder 32 may be inserted and which corresponds to docking port 35 shown in FIG. 1. An open area 80 is also provided on front panel 76 and is wide enough to permit passage of the optical switch and its supporting chassis extended side wall members 64 and 65.

Referring to FIG. 5, and mounted on the chassis front panel 76 are upper solenoid 82, shown in an energized or on position and lower solenoid 84, shown in a de-energized or off position. The upper and lower solenoids may be both placed on either side of the opening 80 on the front panel 76. Alternatively, either solenoid 82 or 84 may be mounted on the front panel 76 at either side of the opening 80. Operation of the solenoid 82 and 84 will be described in greater detail below.

Figure 3:
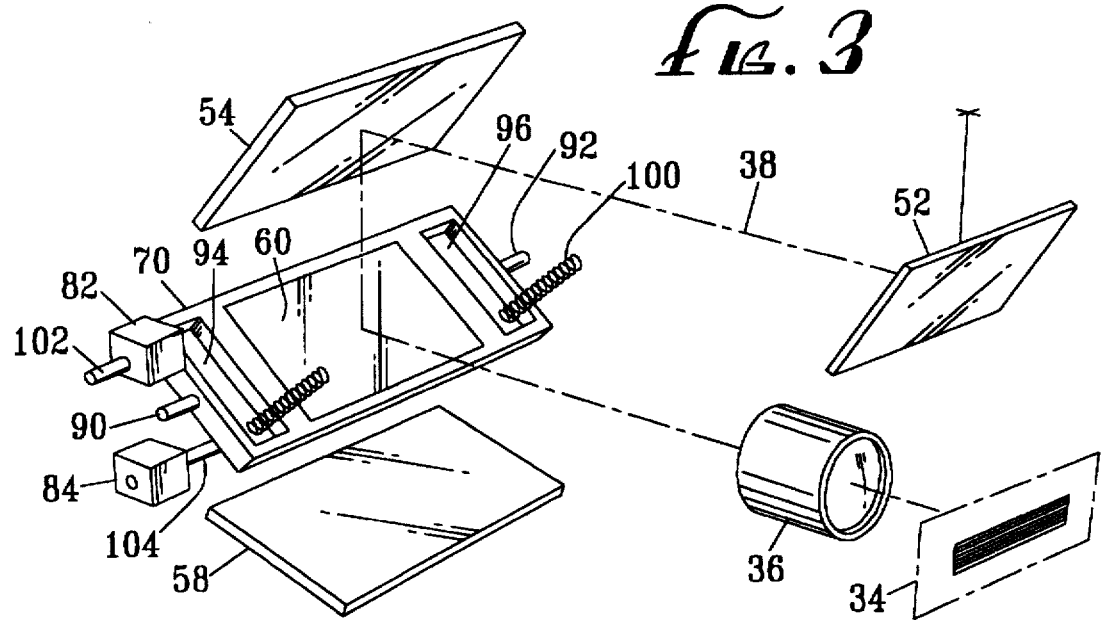
FIG. 3 is an exploded, partial perspective view of the scanning camera of FIG. 2, with the flip mirror shown in the reflective mode of operation.

Referring to FIG. 3, various components of the switch mirror assembly are illustrated. The switch mirror frame 70 is fitted with first axle 90 and second axle 92. Axles 90 and 92 in turn are positioned in the side wall members 64 and 65, and together provide for rotation of the frame 70, and the switch mirror 60, as will be described in greater detail below. Opposite sides of the frame 70 include a first cavity 94 and a second cavity 96, through which the spring loaded first stop 98 and second spring loaded stop 100 extend and function to bias the frame 70 in either the transmissive or reflective mode of operation, after being positioned in one of those modes during the set-up operation, described in detail below. Upper solenoid 82 includes solenoid piston 102 and lower solenoid 84 includes piston 104. In FIG. 3 the switch mirror assembly is shown configured for reflective mode, whereby reflected light from the object is then reflected from mirror 52 to mirror 54 and then to mirror 60, and then through lens 36 and then to CCD 34 in optical pathway 38. To set up this configuration lower solenoid 84 is energized, with its piston 104 extended and upper solenoid 82 is deenergized, with its piston 102 retracted.

Figure 4:
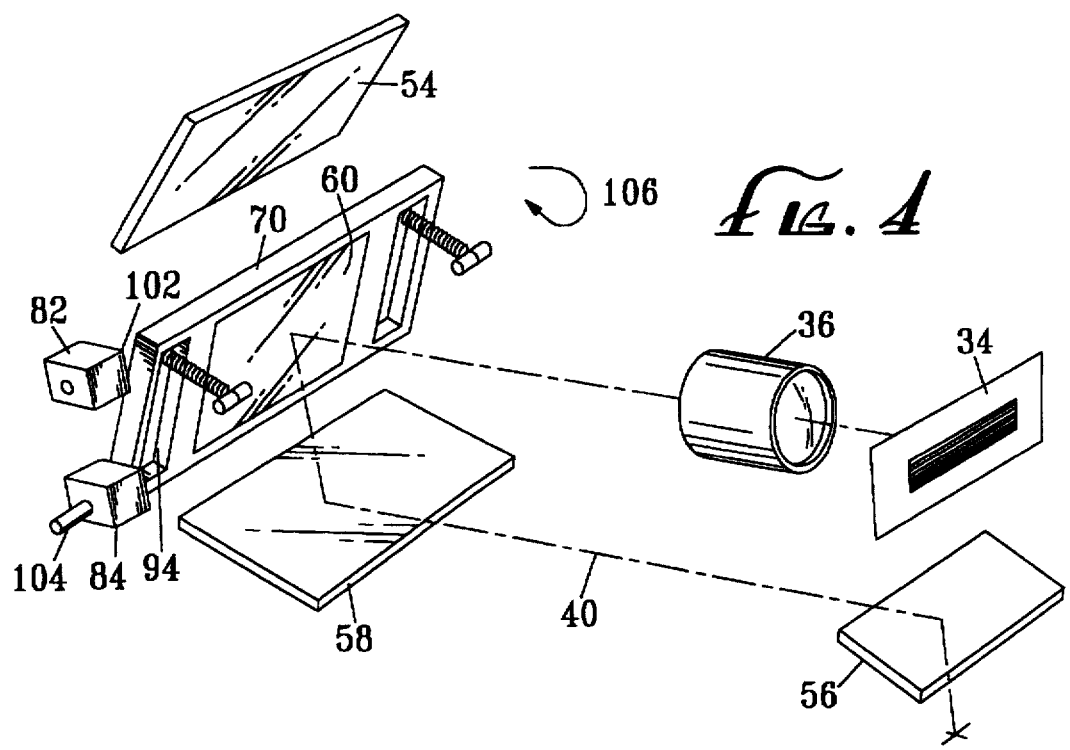
FIG. 4 is an exploded, partial perspective view of the scanning camera of FIG. 2, with the flip mirror shown in the transmissive mode of operation.

Referring to FIG. 4, the switch mirror assembly is shown in the transmissive mode, so that during scanning operation light is reflected from mirror 56 to mirror 58 to mirror 60 through lens 36 and then to CCD 34 in the optical pathway 40. To set up this configuration the upper solenoid 82 is energized with piston 102 extended and lower solenoid 84 is deenergized with piston 104 retracted. In transitioning from the reflective position of FIG. 3 to the transmissive position of FIG. 4, the frame 70 and its switch mirror 60 have been rotated in the direction of arrow 106 shown in FIG. 4, through operation of a routine programmed into a micro controller which operates a stepper motor and solenoids 82 and 84. The optical switch is thus configured to toggle the switch mirror 60 between a reflective scanning position and a transmissive scanning position, thereby changing the origin of the image as viewed by the CCD.

The transmissive branch segment includes a lower tubular fluorescent lamp 24 (FIG. 2) secured on a light fixture 86 underlying the carriage in spaced apart relation thereto. The light fixture and bulb extend width-wise across and under the carriage between a pair of mounting brackets that secure the underlying fixture to the under side of the carriage. This lower light bulb 24 projects light up through the portion of transmissive scanning platform 32 directly overlying the light source and through optical pathway 40.

The transmissive platform 32 is removably positioned on the pair of docking tracks 72 and 74 (FIG. 5) which run lengthwise through the scanner housing in parallel with the rails 50 and 51. The docking tracks extend through a gap formed between the carriage and the lower light source. The transmissive scanning platform 32 is inserted through a docking port 35 on the front side of the scanner housing and the gap 78 in front panel 76 along the docking tracks. The transmissive scanning platform 32 provides a secure holder for a transparency or slide. Such transmissive platforms come in a variety of configurations, each such platform configuration is tailored to the specific type transparent media to be scanned. Examples of transmissive platforms fit for this purpose are disclosed in U.S. Pat. No. 5,546,144, which is incorporated by reference herein.

Contained within the housing are a conventional power circuit connected to the controller circuit. The controller circuit includes a Read Only Memory (ROM) for storing a scanner operation program that is operated by a processor to conventionally control the light sources 24, 26 and 28; a stepper motor (not shown); and CCD 34 and to communicate with the personal computer (PC). The control circuit also includes analog to digital (A/D) convertors connected to the CCD 34. The A/D convertors convert the analog signals into a digital form. Conventional digital signal processing techniques may then be applied to the scanned image data by the scanner CPU to enhance the image. The image data is then sent to the PC for storage. The hardware configurations for these circuits may be of any conventionally available type presently used in conventional scanners and are largely dependent upon the type digital camera used.

Connected in circuit to an interrupt lead within the controller circuit are the solenoid relays 82 and 84. Each solenoid relay, also known as a plunger relay or solenoid, includes a moveable core or plunger that extends out of one end of the solenoid relay in response solenoid action caused by an electrical current sent from the controller circuit to the solenoid relay. When the controller circuit stops power to the solenoid relay, the moveable core is drawn back into the solenoid. The moveable cores of the solenoid relays are used to electronically toggle the optical switch. When the carriage is drawn lengthwise across the rails 50 and 51 toward front wall panel 76 (FIG. 5), and core 102 of upper solenoid 82 is extended, the frame 70 contacts the core 102 and is forced to rotate in the direction of arrow 106, as shown in FIG. 4. Similarly when core 104 of lower solenoid 84 is extended and the carriage 46 is drawn toward front wall panel 76, core 104 will contact the lower part of frame 70 and cause it to rotate about its axles 90 and 92 in the opposite direction of arrow 106 until it is stopped. Operation of the solenoids and control of the light sources is accomplished by a platform selection subroutine included within the scanner firmware stored in the controller circuit ROM. A button included on the surface of the scanner, or represented by a prompt within commercial software included with the personal computer, provides a user interface which allows the operator to activate the platform selection subroutine to select a desired scanning platform.

Operation of the Scanner

Figure 6:
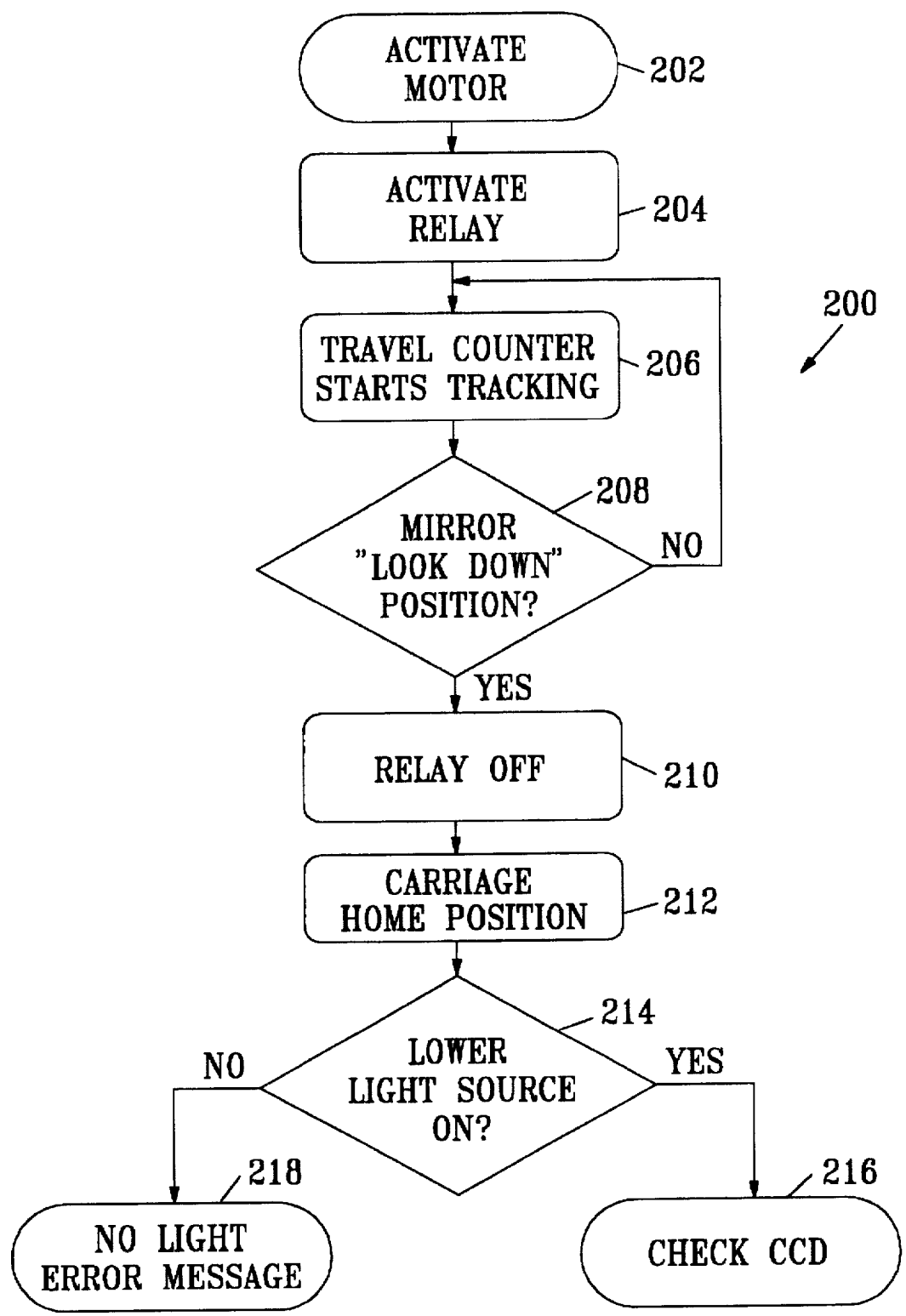
FIG. 6 is a flow diagram of a platform selection routine of the present invention for the transmissive mode of operation.

Before operation of the scanner, as described above, the scanner is connected to a conventional power outlet and to a personal computer having commercial scanning software capable of operating with the scanner. Because the scanner includes two scanning platforms, the conventional scanning operation can only occur after selection of either the transmissive or reflective scanning platform. In the preferred embodiment, the selection of the scanning platform is made by the operator using the user interface, such as a button or switch located on the scanner, or by means of a software setting added to the software within the personal computer. A selection signal is sent to the processor of the controller circuit which in response activates the platform selection routine. The selection signal must be capable signaling the CPU at two signal levels. A first signal level indicating selection of the transmissive platform and a second level indicating selection of the reflective platform. The platform selection routine includes a transmissive platform routine 200, FIG. 6, and a reflective platform routine 300, FIG. 7.

Transmission Mode Set Up Routine

The transmissive routine 200 activates the stepper motor in step 202 to return the carriage 46 to a home position. The home position is a predetermined position along the rails proximate to the front end 76 of the scanner, but not in contact with either solenoid 82 or 84. The solenoid relay 82 is activated at step 204 to extend the core 102 out into the path of the frame. The stepper motor is then activated to move the carriage 46 along the rails 50 towards the solenoid 82. At step 206, a travel counter is initialized and tracks the movement of the carriage 46 along the rails by counting the incremental rotation of the stepper motor drive shaft, which is two hundred (200) steps per rotation in the preferred embodiment. The carriage 46 moves along the rails towards the front wall panel 76 of the scanner chassis 44. Frame 70 and switch mirror then contact core 102, and begins to rotate as shown in FIG. 4. As the carriage 46 continues to move along the rails 50 and 51, the mirror eventually rotates to its "look down" position at step 208, and then, at step 210, the solenoid is turned off. The carriage 46 then returns to the home position at step 212. The lower light source 24 is then turned on at step 214. If the mirror is properly positioned and the light 24 is working, light is transmitted through the transmissive branch optical path 40, the lens 36 and to the CCD 34. The control circuit then checks the CCD to ensure that the light is being received at step 216. If the light is received, the scanner can then begin conventional scanning from the transmissive scanner platform. Otherwise, an error message is generated at step 218 indicating that the light from the lower light source 24 has not been received.

Reflective Mode Set Up Routine

The reflective routine 300 also activates the stepper motor to return the carriage to the home position at step 302 along the rails proximate to the front wall panel 76 of the scanner. The stepper motor is then activated to move the carriage along the rails towards the opening 80 in front wall panel 76 the of the housing at step 304. Solenoid relay 84 is activated at step 306 to extend the core 104 out into the path of the frame 70. The carriage 46 continues along the rails 50 towards solenoid 84. At step 308, a counter tracks the movement of the carriage along the rails by counting the incremental rotation of the stepper motor drive shaft. As the carriage 46 continues to move, it contacts frame 70, and it causes it to rotate in a direction opposite that shown by arrow 106 in FIG. 4. When frame 70 and mirror 60 have been rotated to the "look up" position, step 310, the stepper motor is stopped, and the spring loaded stops 98 and 100 bias the frame 70 to remain in the reflective mode position. Then, at step 312 the carriage 46 is returned to the home position. Upon the counter reaching a value indicating that the toggle point has been reached, the solenoid is turned off at step 314. The upper light sources 26 and 28 then turned on at step 316. If the mirror 60 is properly positioned in the optical pathway 38 and the lights are working, light is transmitted through the reflective branch segment into the optical pathway 38 towards the lens 36 and CCD 34. The control circuit then checks the CCD to ensure that the light is being received, step 318. If the light is received, the scanner can then begin conventional scanning from the reflective scanner platform. Otherwise, an error message is generated, step 320 indicating that the light from the upper light source has not been received.

Once the transmissive or reflective scanning platform has been selected, the scanner is ready to scan documents on that platform in a conventional manner. If the scanner is configured to shift light from the reflective scanner towards the lens and CCD, a document or photograph is placed on the glass platen. The lid is closed, the upper lamp is activated and the stepper motor incrementally draws the carriage under the glass platen. If the scanner is configured to shift light from the transmissive scanner towards the lens and CCD, a transparency or slide is placed on the transmissive platform. The transmissive platform is inserted into the docking port along the docking track and the hood is closed. The lower lamp is activated and the stepper motor incrementally draws the carriage with lamp across the transmissive platform.

It will be understood that certain features and sub-combinations are of utility and may be employed without reference to other features and sub-combinations as they are outlined within the claims. While the preferred embodiment and application of the invention has been described, it is apparent to those skilled in the art that the objects and features of the present invention are only limited as set forth in claims attached hereto.

What is claimed is:

1. In a transmissive/reflective optical scanning apparatus comprising a scanner housing; a carriage; two rails extending along the length of the housing and adapted to carry said carriage; a reflective scanning platform; a transmissive scanning platform; a scanning camera positioned proximate to said reflective scanning platform and adapted to selectively view said platforms and generate electrical signals representative of the images viewed; and a rotatable optical switch, the improvement comprising a first solenoid relay positioned at a first end of said rails and adapted to set up the apparatus in a transmissive scanning mode; whereby said first relay causes rotation of said optical switch in a first direction when energized and when contacted by said switch as it moves along and reaches a predetermined position near one end of said rails.

2. The scanning apparatus of claim 1, said scanning camera further including: a second solenoid relay positioned at said first end and adapted to set up the apparatus in a reflective mode; whereby said second relay causes rotation of said optical switch in a direction opposite to the first direction when said second relay is engaged and when contacted by said switch as it moves along and reaches a predetermined position near said one end of said rails.

3. The scanning apparatus of claims 1 or 2, including a roller bar extending across the optical switch in a direction orthogonal to said rails.

4. The scanning apparatus of claim 2, including a controller circuit connected to said scanning camera and operative to activate said scanning camera such that, upon activating said scanning camera, said camera receives said scanning camera electrical signals.

5. The scanning apparatus of claim 2 wherein said relays are both positioned adjacent one of said rails.

6. The scanning apparatus of claim 2 wherein one of said relays is positioned adjacent an end of one of said rails and the other of said relays is positioned adjacent the other of said rails.

* * * * *